US012689421B2

(12) United States Patent
Helmy Mohamed et al.

(10) Patent No.: US 12,689,421 B2
(45) Date of Patent: Jul. 21, 2026

(54) REDUCED COMPLEXITY IN UPLINK RECEIVE BEAMFORMER CALCULATIONS

(71) Applicant: META PLATFORMS, INC., Menlo Park, CA (US)

(72) Inventors: Ahmed Gamal Helmy Mohamed, San Jose, CA (US); Mustafa Emin Sahin, Mckinney, TX (US); Krishna Srikanth Gomadam, San Jose, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 817 days.

(21) Appl. No.: 18/145,962

(22) Filed: Dec. 23, 2022

(65) Prior Publication Data

US 2024/0214044 A1      Jun. 27, 2024

(51) Int. Cl.
H04B 7/06 (2006.01)
H04L 5/00 (2006.01)
H04L 25/02 (2006.01)

(52) U.S. Cl.
CPC ......... H04B 7/0617 (2013.01); H04L 5/0051 (2013.01); H04L 25/0242 (2013.01)

(58) Field of Classification Search
CPC .. H04B 7/0617; H04L 5/0051; H04L 25/0242
See application file for complete search history.

(56) References Cited

U.S. PATENT DOCUMENTS

| | | | |
|---|---|---|---|
| 11,018,903 B2 | 5/2021 | Cui et al. | |
| 11,349,621 B2 | 5/2022 | Baldemair et al. | |
| 2020/0328861 A1* | 10/2020 | Malladi | H04L 5/0069 |
| 2021/0184808 A1 | 6/2021 | Liu et al. | |
| 2022/0123896 A1* | 4/2022 | Taherzadeh Boroujeni | H04L 5/0055 |
| 2025/0047342 A1* | 2/2025 | Huang | H04B 7/0413 |

OTHER PUBLICATIONS

Huawei., "TM9 Higher Order MIMO Enabler," Mobile World Conference, Feb. 26, 2018, 20 pages.
Lin X., et al., "5G New Radio: Unveiling the Essentials of the Next Generation Wireless Access Technology," arXiv:1806.06898, Jun. 18, 2018, 8 pages.
Techplayon., "5G NR Reference Signals (DMRS, PTRS, SRS and CSI-RS)," Sep. 26, 2018 [Retrieved on Dec. 28, 2022], 11 pages, Retrieved from the Internet: URL: https://www.techplayon.com/5g-nr-reference-signals-dmrs-ptrssrs-and-csi-rs/.

* cited by examiner

*Primary Examiner* — Ricky Q Ngo
*Assistant Examiner* — Stephen N Steiner
(74) *Attorney, Agent, or Firm* — EVERSHEDS SUTHERLAND (US) LLP

(57) ABSTRACT

Methods, systems, and apparatuses for calculating and using uplink receive beamformers in wireless devices. In a demodulation reference signal (DMRS)-based beamformer calculation scheme, the computational complexity might be overwhelmingly high if a unique beamformer is calculated for each and every single resource element (RE). There may be combinations via frequency, time, or other means across resource block groups (RBGs) to consolidate the number of beamformers to be calculated.

16 Claims, 6 Drawing Sheets

141   Determine DMRS Anchor

142   Calculate Beamformer For DRMS Anchor

143   Associate Calculated Beamformer With Influence Region

144   Communicate Beamformer For REs In Influence Region

161   Determine DMRS Anchors

162   Consolidate DMRS Anchors

163   Calculate Beamformer for Consolidated DRMS Anchor

164   Associate Calculated Beamformer With Influence Region

165   Communicate Beamformer For REs In Influence Region

REDUCED COMPLEXITY IN UPLINK RECEIVE BEAMFORMER CALCULATIONS

TECHNOLOGICAL FIELD

The disclosed subject matter relates generally to methods, apparatuses, or computer program products for radio access network uplink receive beamformer calculations.

BACKGROUND

As more and more communication devices require more communication capacity, there is a need for improved mobile broadband communication over existing radio access technology. The next generation in communication technology is called new radio access technology (referred herein as 5G or NR). To improve coverage and capacity in 5G communication systems, methods including but not limited to digital/analog beamforming, massive multiple-input multiple-output (MIMO), full dimensional MIMO (FD-MIMO), and large-scale antenna techniques are employed. Accurate uplink (UL) receive beamforming performed at the base station may be a significant consideration for the efficiency of the UL of 5G systems. UL receive beamformer calculations may be computationally very demanding. Therefore, there may be a need for methods to reduce beamformer calculation complexity while keeping the accuracy at an optimum level.

SUMMARY

Disclosed herein are methods, apparatuses, or systems for using or adjusting uplink beamformer calculations. In an example, an apparatus may include one or more processors and memory. The memory may be coupled with the one or more processors and store executable instructions that when executed by the one or more processors cause the one or more processors to effectuate operations that include receiving a demodulation reference signal (DMRS); receiving an indication of a DMRS anchor, wherein the DMRS anchor is associated with a resource element; determining a channel estimate of the DMRS anchor based on the DMRS; determining a beamformer of the DMRS anchor based on the channel estimate; associating the DMRS anchor with an influence region, wherein the influence region may include a plurality of resource elements; and assigning the beamformer of the DRMS anchor to the plurality of resource elements.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Figure 1:
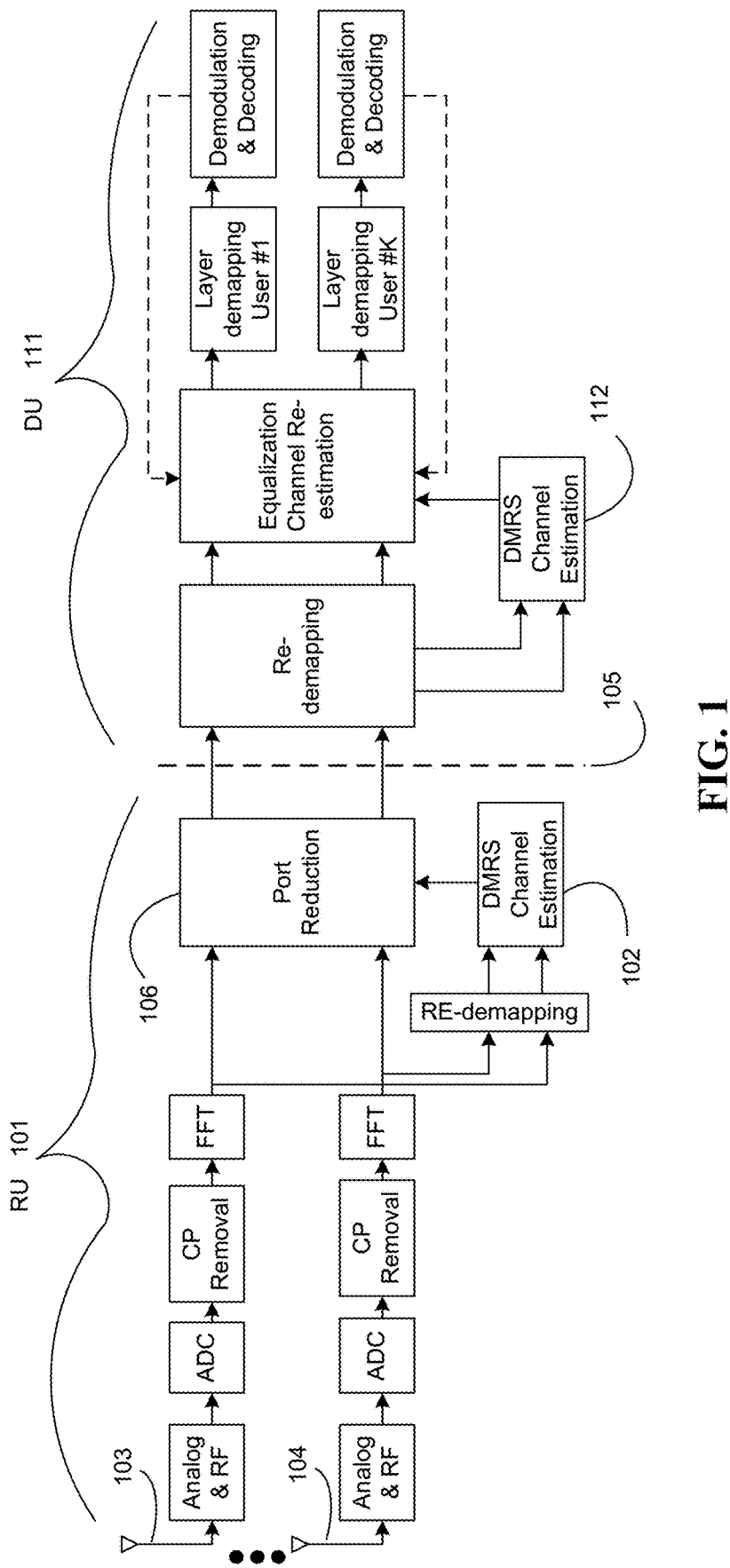
FIG. 1 illustrates an exemplary wireless capable device for performing the disclosed uplink beamforming scheme.

The figures depict various examples for purposes of illustration only. One skilled in the art will readily recognize from the following discussion that alternative examples of the structures and methods illustrated herein may be employed without departing from the principles described herein.

DETAILED DESCRIPTION

Some examples of the present invention will now be described more fully hereinafter with reference to the accompanying drawings, in which some, but not all examples of the invention are shown. Indeed, various examples of the invention may be embodied in many different forms and should not be construed as limited to the examples set forth herein. Like reference numerals refer to like elements throughout.

It is to be understood that the methods and systems described herein are not limited to specific methods, specific components, or to particular implementations. It is also to be understood that the terminology used herein is for the purpose of describing particular examples only and is not intended to be limiting.

Disclosed herein are systems, methods, and apparatus that may assist in reducing complexity of uplink beamformer calculations. In a first example demodulation reference signal (DMRS)-based beamformer calculation scheme, beamformers may not be calculated for every single resource element (RE) in a resource block group (RBG). For instance, in case of 2RBs per RBG the number of beamformers per RBG would be $2 \times 12 \times 14 = 336$. Instead, a consolidated number of DMRS-based beamformers per RBG may be calculated in association with an influence region, as described in more detail herein. Calculations have shown a significant complexity reduction of approximately 96%-98%, when 12 or 6 such consolidated beamformers are utilized instead of 336 beamformers in case of 2RBs/RBG. In the second example DMRS-based beamformer calculation scheme, there may be combinations via frequency, time, or other means across RBGs to further consolidate the number of beamformers to be calculated.

FIG. 1 illustrates an exemplary base station 100, such as gNodeB or other wireless capable device, which may be a massive multiple-input multiple-output (mMIMO) system. As shown, base station 100 may include a plurality of antennas, such as antenna 103 and antenna 104, but base station 100 may have an antenna panel array of many more antennas (e.g., 32 or 64 antennas). In addition, base station 100 may be functionally separated into a radio unit (RU) 101 and a distributed unit (DU) 111. RU 101 and DU 111 may communicate via fronthaul interface 105 which is represented as a dotted line. This functional split of RU 101 and DU 111 may be significant in how base station 100 is designed and therefore the performance of base station 100. For example, the complexity of RU 101 or DU 111 may increase when compared to conventional systems.

Base station 100 may include port reduction module 106. Channel condition may be used to calculate port reduction in the uplink. In uplink transmission for 5G NR there are 2 different reference signals that base station 100 may use to capture the channel condition between base station 100 and a user equipment (UE). Those reference signals may be the demodulation reference signal (DMRS) and the sounding reference signal (SRS).

In an example, each unit (e.g., RU 101 and DU 111) may respectively include a demodulation reference signal (DMRS) channel estimation (CE) function (e.g., DMRS CE 102 and DMRS CE 112). In some scenarios, sounding reference signals (SRS) (not shown) transmitted from the UE (not shown) may be used for beamformer calculation by the DU 111 instead of DMRS CE 102 located in RU 101. SRS may be transmitted by the UE periodically in time intervals that usually exceed more than 1 millisecond (ms) (e.g., every 5 ms, 10 ms, or 20 ms). The period for SRS may depend on upper layer configurations from base station 100 for each UE. UL DMRS, on the other hand, may be transmitted by the UE along with the physical uplink shared channel (PUSCH). Depending on its functional architecture, base station 100 may perform channel estimation when SRS or DMRS is received, which may be used as channel state information (CSI) for calculation of an uplink receive (Rx) beamformer.

Because DMRS is received along with the PUSCH, the use of DMRS leads to more up-to-date channel estimation when compared to the use of SRS. SRS based Rx beamformer may become outdated by the time it is used due to various factors including the delay due to the SRS periodicity (such as 5, 10, or 20 ms) or the delays in DU 111 caused by the durations needed for processing SRS, computing the UL Rx beamformer, or conveying the beamformer to RU 101. Compared to SRS, DMRS based fresh channel estimate has the potential of leading to much more accurate Rx beamforming, especially in high mobility and high interference conditions. Note that high mobility conditions may occur when the UEs or various objects in the channel move at a high speed (e.g., 10+ miles/hour). Note that high interference conditions may occur when the UL transmissions from UEs in adjacent cells happen to be received strongly in the desired cell. Yet, the DMRS based channel estimation and beamformer calculation may be performed in the RU 101. This may lead to a significant increase in hardware processing (e.g., digital signal processor processing (DSP)) in the RU 101, resulting in an increased RU complexity, power consumption, cost, or weight.

With continued reference to channel estimation (CE) calculation, in a scenario for SRS based CE, there may be a calculation of only one beamformer per resource block group (RBG) (e.g., with 2 RBs/RBG, 1 beamformer per 24 REs×14 symbols=336 REs), based on fronthaul interface 105 related limitations (e.g., bandwidth or number of beam identifiers).

In the exemplary case as shown in FIG. 1, since the CE may be performed across time and frequency, beamformer calculation may potentially be performed for multiple resource elements (REs) per RBG in time and in frequency as well. DMRS-based CE may be interpolated/extrapolated to obtain a CE for every single RE per RBG. If a unique beamformer is calculated for each RE in the RBG, it leads to an extremely high computation complexity.

Figure 2:
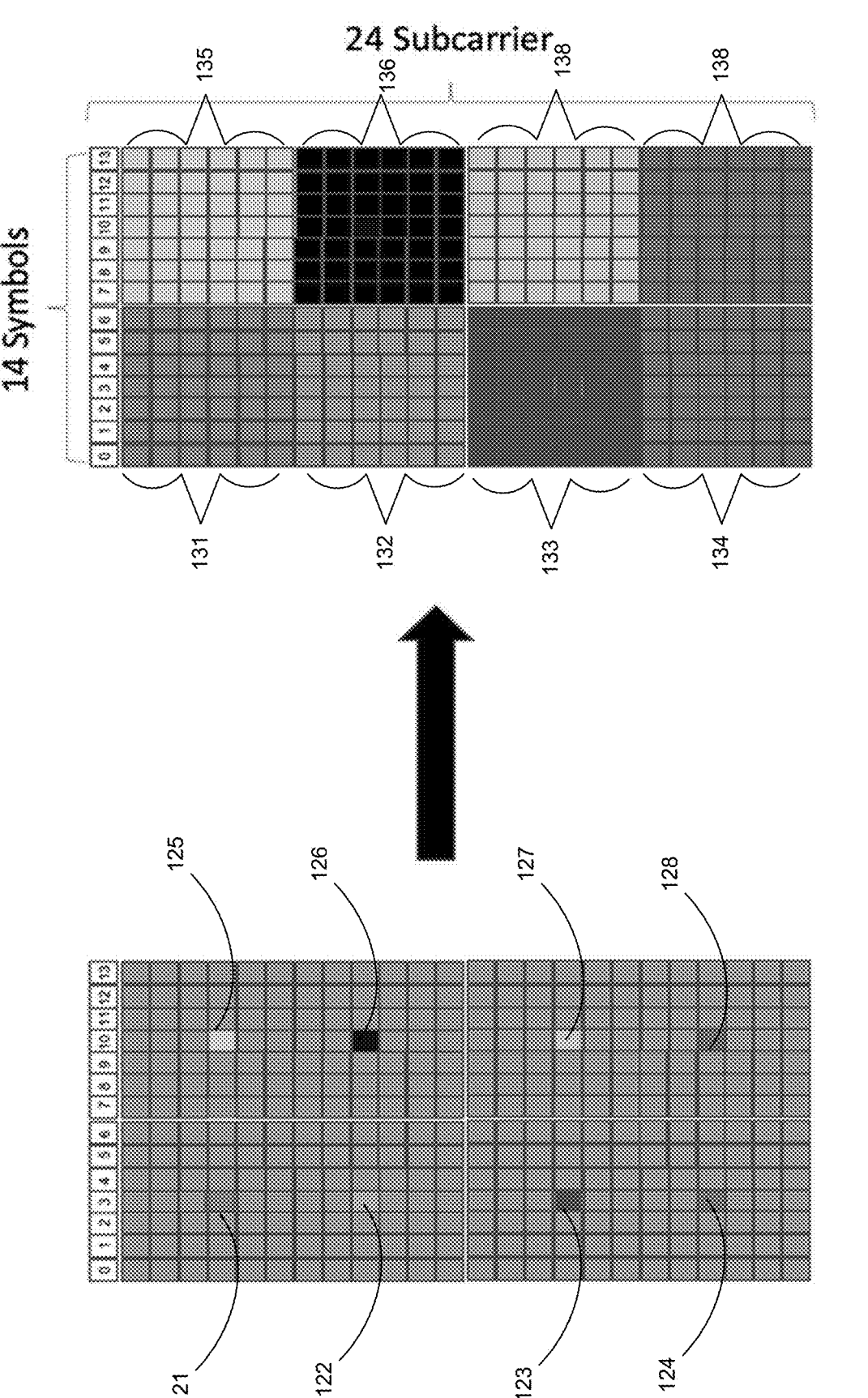
FIG. 2 illustrates an example uplink beamforming scheme with a DMRS anchor.

FIG. 2 shows an exemplary illustration of 8 DMRS anchors/RBG. For a given DMRS configuration, a specific number of DMRS anchors in an RBG may be defined. As shown in the example of FIG. 2, there may be e.g., 8 DMRS anchors (DMRS anchor 121-DMRS anchor 128). A DMRS anchor is a selected RE that may be the basis of an influence region. The DRMS anchors may be determined based on the time and frequency coherency of channel estimates obtained from different DMRS REs. The higher the coherency, the less number of anchors will be needed. Number of anchors may depend on the number of UEs that are scheduled in the same RBG, as well. For a higher number of UEs, a greater accuracy in beamforming may be needed, which may require a greater number of anchors. Finally, number of anchors may also be determined based on the availability of computational resources, e.g., a smaller number of anchors may be selected when processing power is more limited.

The set of REs (in time and frequency) within an RBG influenced by a particular DMRS anchor may be called an "influence region." Once the influence region is defined, the channel estimates obtained for the UEs scheduled in that RBG at a given DMRS anchor may be used in that influence region to calculate a single beamformer to be used for the REs in the defined influence region as exemplified in FIG. 2. The number of influence regions may depend on DMRS configuration.

Each DMRS anchor may be associated with a respective influence region. Table 1 provides an example DMRS anchor and linked influence region (e.g., DMRS anchor 121 associated with influence region 131 and DMRS anchor 122 associated with influence region 132, etc.).

TABLE 1

| DMRS Anchor | Influence Region |
| --- | --- |
| DMRS Anchor 121 | Influence Region 131 |
| DMRS Anchor 122 | Influence Region 132 |
| DMRS Anchor 123 | Influence Region 133 |
| DMRS Anchor 124 | Influence Region 134 |
| DMRS Anchor 125 | Influence Region 135 |
| DMRS Anchor 126 | Influence Region 136 |
| DMRS Anchor 127 | Influence Region 137 |
| DMRS Anchor 128 | Influence Region 138 |

Figure 3:
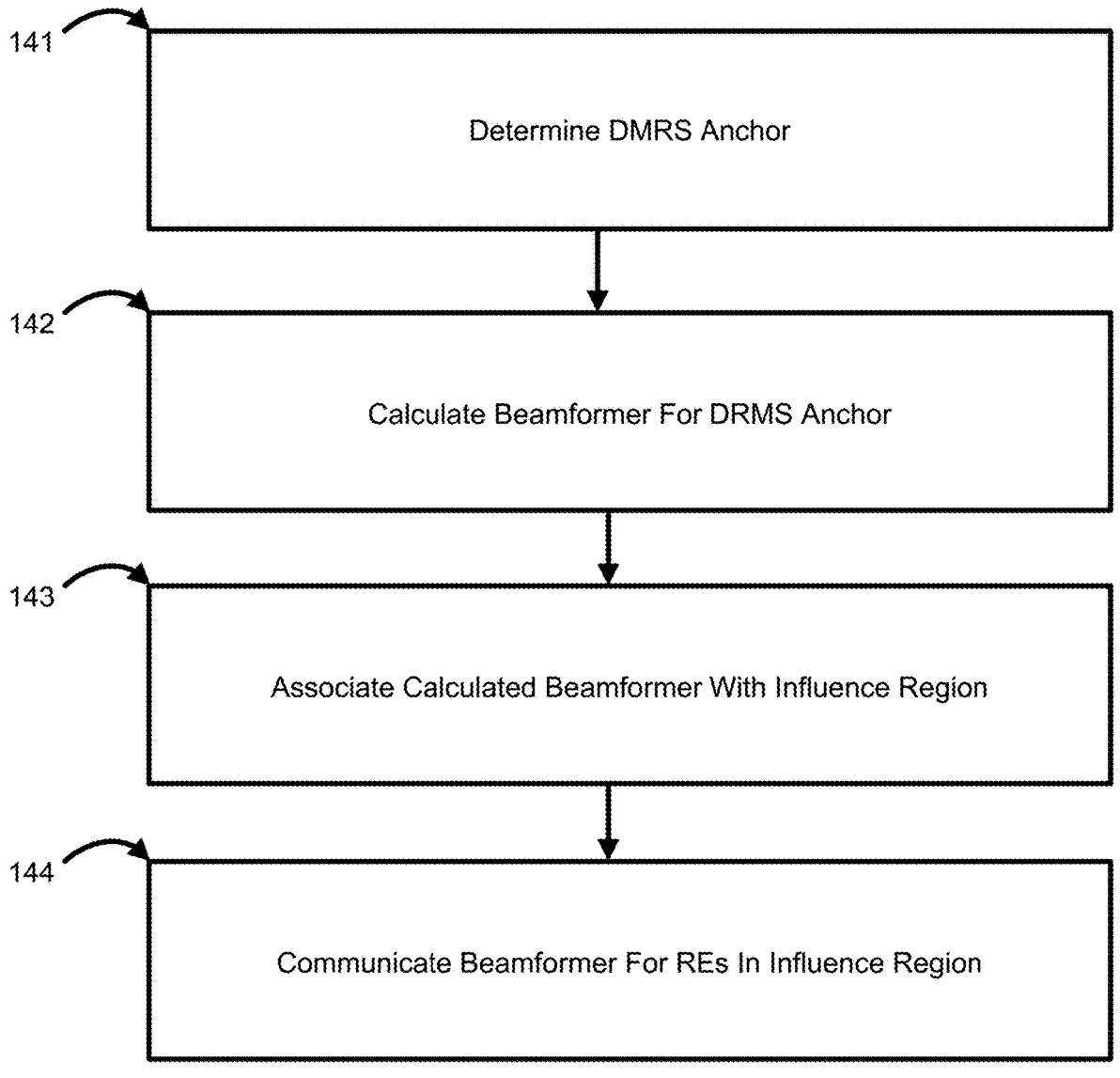
FIG. 3 illustrates an example method for uplink beamformer determination with a DMRS anchor.

FIG. 3 illustrates an exemplary method for uplink beamformer calculations. At step 141, determine the DMRS anchors which may take into account the various factors including channel coherence between DMRS REs, the number of UEs (or UE layers) scheduled in the target RBG, or availability of computational resources. In the example of FIG. 2, there are 8 DMRS anchors.

At step 142, perform DMRS based channel estimation at the DMRS anchors for the UEs scheduled in the current RBG. At each DMRS anchor establish a channel matrix whose size is 'number of receive chains' by 'number of UL layers'. Then, using the channel matrix calculate the beamformer matrix for the DMRS anchor. In the example associated with FIG. 2, beamformer matrix of DMRS anchor 121 may be calculated, as well as each beamformer matrix for DMRS anchor 122-DMRS anchor 128. The beamformer of DMRS anchor 121 may be calculated using the channel estimate of DMRS anchor 121 as well as other parameters, such as the noise whitening matrix of DMRS anchor 121.

At step 143, associate the calculated beamformer matrix of step 142 to a set of REs (e.g., an influence region). In the example associated with FIG. 2, the calculated beamformer matrix of DMRS anchor 121 may be associated with influence region 131, in which beamformer matrix may have a value A. Therefore, the REs of influence region 131 will have the same beamformer matrix (e.g., value A) as calculated in step 142. The same steps and considerations apply to influence region 132-influence region 138 in this example.

At step 144, communicate or use the calculated beamformer of each resource element of the influence region as the calculated beamformer of step 142. For example, value A may be communicated to the port reduction module 106 of RU 101 for the REs in influence region 131, in order for the port reduction module 106 to use.

Figure 4:
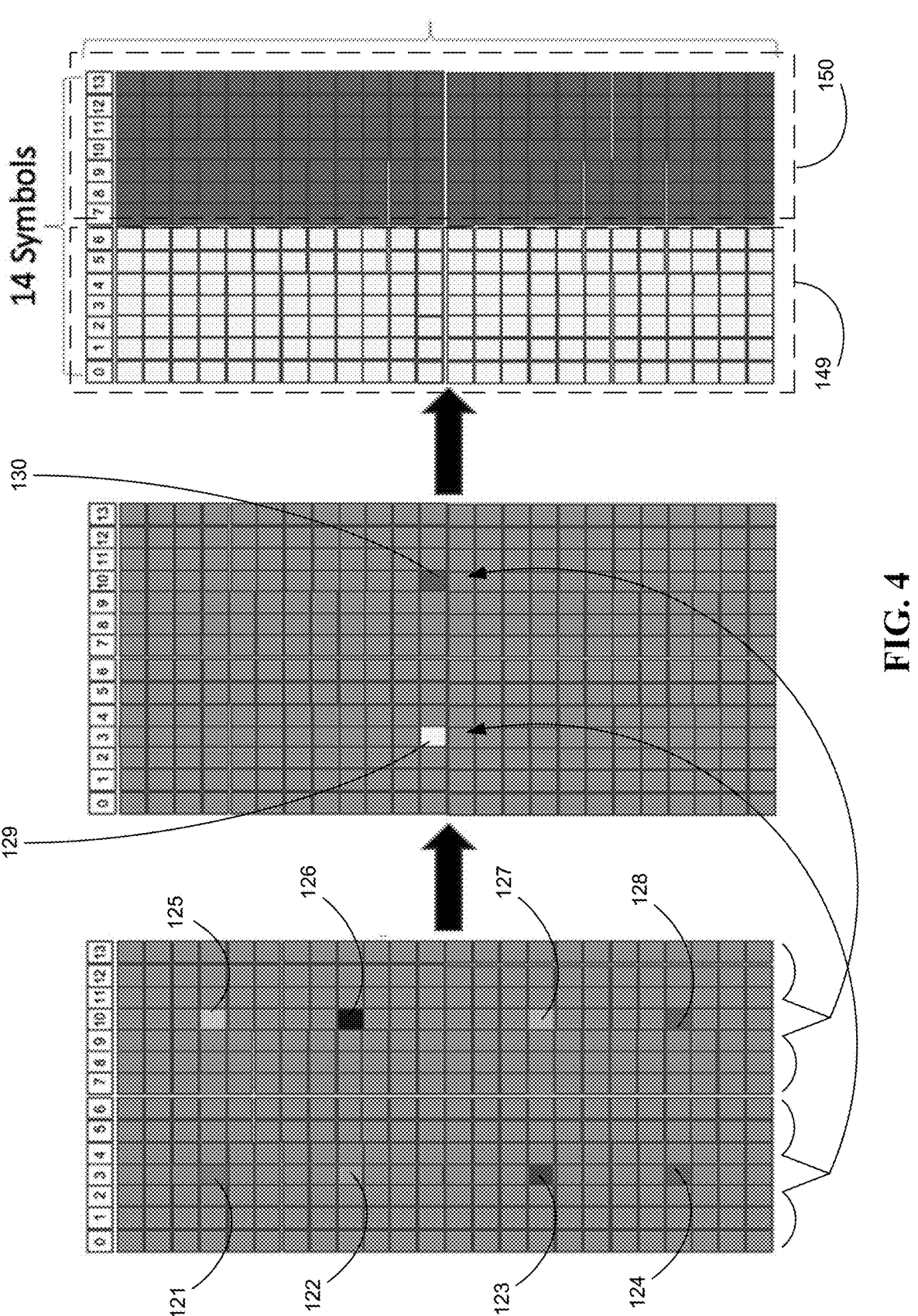
FIG. 4 illustrates an example uplink beamforming scheme with a combined DMRS anchor.

FIG. 4 is an exemplary illustration where 2 consolidated DMRS anchors are obtained from 8 DMRS anchors/RBG. This scheme may reduce the beamformer calculation complexity compared to the first example DMRS-based beamformer calculation scheme of FIG. 2 and FIG. 3.

DMRS anchor 121-DMRS anchor 128 may be consolidated to DMRS anchor 129 and consolidated DMRS anchor 130. Consolidated DMRS anchor 129 may be based on an average (or other calculation) of DMRS anchor 121-DMRS anchor 124. Consolidated DMRS anchor 130 may be based on an average (or other calculation) of DMRS anchor 125-DMRS anchor 128. In an example, channel estimates may be averaged over the time domain or frequency domain (which may be complex number averaging) to determine consolidated DMRS anchor 129 or consolidated DMRS anchor 130. As shown in FIG. 4, there may be frequency domain combining across DMRS anchors sharing the same time domain characteristics. The consolidated DMRS anchor 129 and consolidated DMRS anchor 130 may be associated with respective influence region 149 and influence region 150, as shown in Table 2 and FIG. 4. Calculations using this second example DMRS-based beamformer calculation scheme have shown a significant complexity reduction of approximately 75% when 4 DMRS anchors are consolidated into 1, and 83% when 6 DMRS anchors are consolidated into 1 compared to the first example DMRS-based beamformer calculation scheme of FIG. 2 and FIG. 3.

TABLE 2

| DMRS Anchor | Consolidated DMRS Anchor | Influence Region |
|---|---|---|
| DMRS Anchor 121 | Consolidated DMRS Anchor | Influence Region |
| DMRS Anchor 122 | 129 | 149 |
| DMRS Anchor 123 | | |
| DMRS Anchor 124 | | |
| DMRS Anchor 125 | Consolidated DMRS Anchor | Influence Region |
| DMRS Anchor 126 | 130 | 150 |
| DMRS Anchor 127 | | |
| DMRS Anchor 128 | | |

Figure 5:
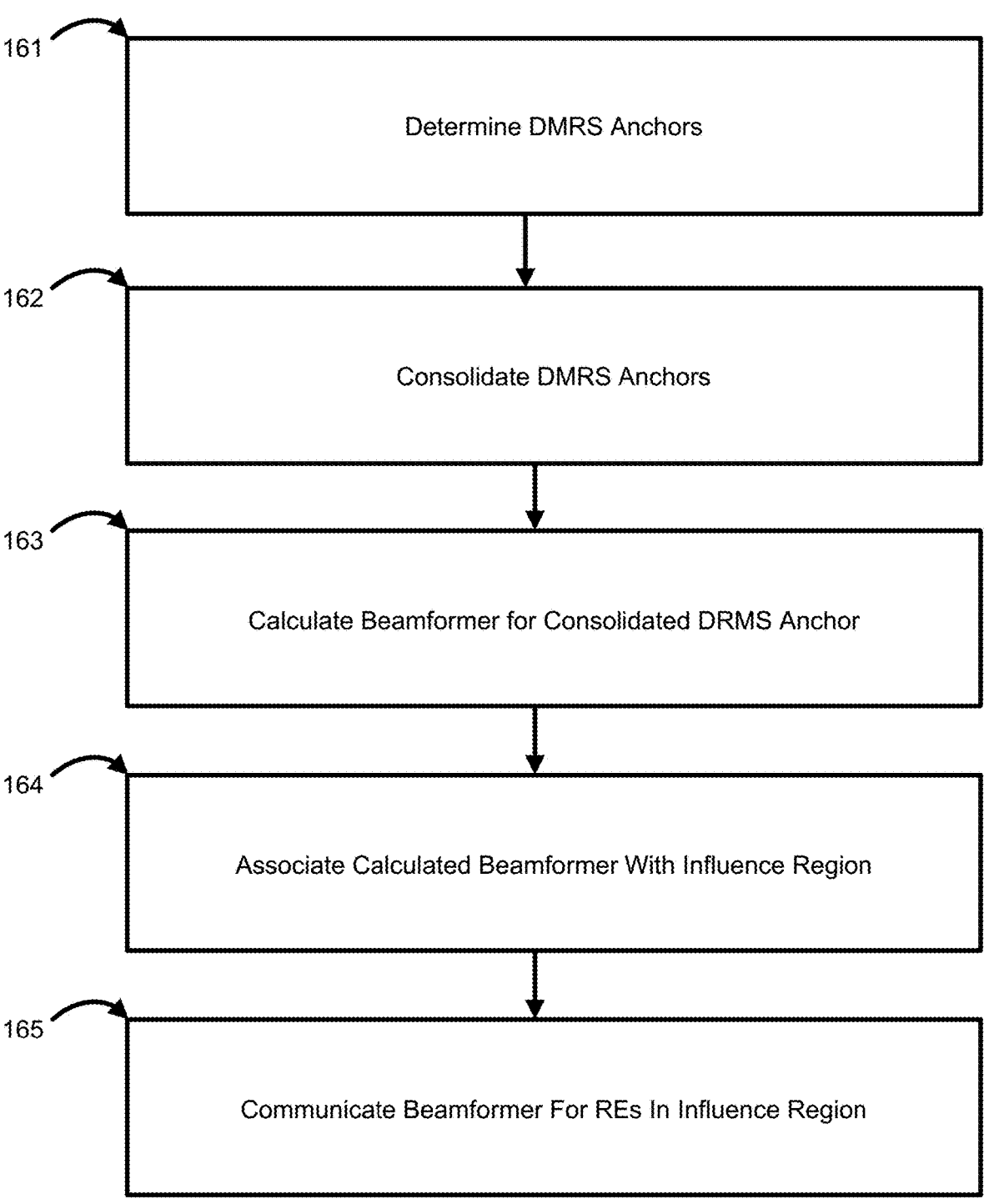
FIG. 5 illustrates an example method for uplink beamformer determination with a combined DMRS anchor.

FIG. 5 illustrates an exemplary method for uplink beamformer calculations using a consolidated DRMS anchor 129. At step 161, determine the DMRS anchors taking into account the various factors including channel coherence between DMRS REs, the number of UEs (or UE layers) scheduled in the target RBG, and availability of computational resources. In the example of FIG. 2, there are 8 DMRS anchors.

At step 162, consolidate (e.g., combine) DMRS anchors of step 161. For example, consolidated DMRS anchor 129 may be based on an average (or other calculation) of complex channel estimates obtained at DMRS anchor 121-DMRS anchor 124. Consolidated DMRS anchor 130 may be based on an average (or other calculation) of complex channel estimates obtained at DMRS anchor 125-DMRS anchor 128. In an example, time domain or frequency domain may be averaged to determine consolidated DMRS anchor 129 or consolidated DMRS anchor 130. It may be contemplated herein that advanced methods such as polynomial fitting may be needed rather than simply linear averaging. At each consolidated DMRS anchor establish a channel matrix whose size is 'number of receive chains' by 'number of UL layers'.

At step 163, calculate a beamformer at each consolidated DMRS anchor using the channel matrix. In the example associated with FIG. 4, beamformer of DMRS anchor 129 and beamformer of DMRS anchor 130 may be calculated.

At step 164, associate the calculated beamformer of step 163 to a set of REs (e.g., an influence region). In the example associated with FIG. 4, the calculated beamformer of DMRS anchor 129 may be associated with influence region 149, in which the beamformer may have a value A. Therefore, the REs of influence region 149 will have the same beamformer (e.g., value A) as calculated in step 163. The same steps and considerations may apply with influence region 150 in this example.

At step 165, communicate or use the calculated beamformer of each resource element of the influence region as the calculated beamformer of step 163. For example, value A may be communicated to a port reduction module 106 of RU 101 for the REs in influence region 149.

Simulations were conducted using the two DMRS-based beamformer calculation schemes disclosed herein. For the simulations using the first scheme (e.g., FIG. 2), there was approximately 190%-250% median capacity improvement compared to implementations that use SRS as described herein. For the simulations using the second scheme (e.g., FIG. 4), there was approximately 160%-200% median capacity improvement compared to implementations that use SRS as described herein. Other significant improvements regarding beamformer complexity reduction were achieved in the simulations, as well. Table 3 provides additional information regarding the schemes.

TABLE 3

| DMRS-based Beamformer Calculation Schemes | Median Throughput (Mbps) |
|---|---|
| Perfect Channel Knowledge, Scheme 1 (12BF/RBG) | 14.1 |
| Perfect Channel Knowledge, Scheme 2 (2BF/RBG) | 14 |
| Imperfect Channel Knowledge, Scheme 1 (12BF/RBG) | 13.6 |
| Imperfect Channel Knowledge, Scheme 2 (2BF/RBG) | 11.8 |

Figure 6:
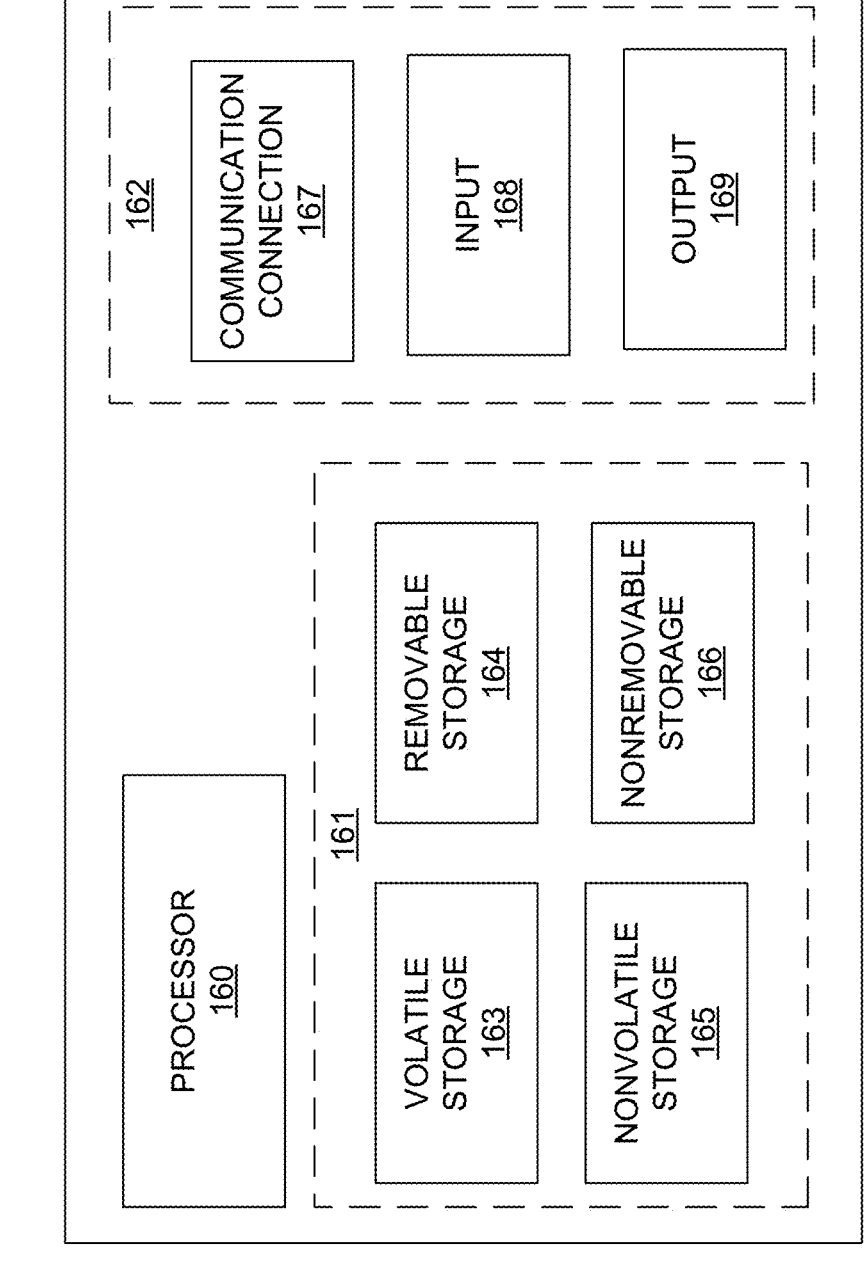
FIG. 6 illustrates an exemplary block diagram of a device for performing the disclosed methods.

FIG. 6 is an exemplary block diagram of a device, such as base station 100, a user equipment (UE), or another device. In an example, base station 100 may include hardware or a combination of hardware and software. The functionality to facilitate telecommunications via a telecommunications network may reside in one or combination of devices. A device may represent or perform functionality of one or more devices, such as a component or various components of a cellular broadcast system wireless network, a processor, a server, a gateway, a node, a gaming device, or the like, or any appropriate combination thereof. It is emphasized that the block diagram depicted in FIG. 6 is exemplary and not intended to imply a limitation to a specific implementation or configuration. Thus, base station 100, for example, may be implemented in a single device or multiple devices (e.g., single server or multiple servers, single gateway or multiple gateways, single controller or multiple controllers). Multiple network entities may be distributed or centrally located. Multiple network entities may communicate wirelessly, via hardwire, or any appropriate combination thereof.

Base station 100, or another device may comprise a processor 160 or a memory 161, in which the memory may be coupled with processor 160. Memory 161 may contain executable instructions that, when executed by processor

160, cause processor 160 to effectuate operations associated with UL beamformer calculations, or other subject matter disclosed herein.

In addition to processor 160 and memory 161, base station 100 or another device may include an input/output system 162. Processor 160, memory 161, or input/output system 162 may be coupled together (coupling not shown in FIG. 6) to allow communications between them. Each portion of base station 100 or another device may include circuitry for performing functions associated with each respective portion. Thus, each portion may include hardware, or a combination of hardware and software. Input/output system 162 may be capable of receiving or providing information from or to a communications device or other network entities configured for telecommunications. For example, input/output system 162 may include a wireless communications (e.g., Wi-Fi, Bluetooth, or 5G) card. Input/output system 162 may be capable of receiving or sending video information, audio information, control information, image information, data, or any combination thereof. Input/output system 162 may be capable of transferring information with base station 100 or another device. In various configurations, input/output system 162 may receive or provide information via any appropriate means, such as, for example, optical means (e.g., infrared), electromagnetic means (e.g., radio frequency (RF), Wi-Fi, Bluetooth), acoustic means (e.g., speaker, microphone, ultrasonic receiver, ultrasonic transmitter), or a combination thereof. In an example configuration, input/output system 162 may comprise a Wi-Fi finder, a two-way GPS chipset or equivalent, or the like, or a combination thereof.

Input/output system 162 of base station 100 or another device also may include a communication connection 167 that allows base station 100 or another device to communicate with other devices, network entities, or the like. Communication connection 167 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 162 also may include an input device 168 such as keyboard, mouse, pen, voice input device, or touch input device. Input/output system 162 may also include an output device 169, such as a display, speakers, or a printer.

Processor 160 may be capable of performing functions associated with telecommunications, such as functions for processing broadcast messages, as described herein. For example, processor 160 may be capable of, in conjunction with any other portion of base station 100 or another device, determining a type of broadcast message and acting according to the broadcast message type or content, as described herein.

Memory 161 of base station 100 or another device may comprise a storage medium having a concrete, tangible, physical structure. As is known, a signal does not have a concrete, tangible, physical structure. Memory 161, as well as any computer-readable storage medium described herein, is not to be construed as a signal. Memory 161, as well as any computer-readable storage medium described herein, is not to be construed as a transient signal. Memory 161, as well as any computer-readable storage medium described herein, is not to be construed as a propagating signal. Memory 161, as well as any computer-readable storage medium described herein, is to be construed as an article of manufacture.

Herein, a computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable storage medium may be volatile, non-volatile, or a combination of volatile and non-volatile, where appropriate.

While the disclosed systems have been described in connection with the various examples of the various figures, it is to be understood that other similar implementations may be used or modifications and additions may be made to the described examples of UL beamformer calculations and use, among other things as disclosed herein. For example, one skilled in the art will recognize that UL beamformer calculations and use, among other things as disclosed herein in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—UL beamformer calculations or use—as illustrated in the Figures, specific terminology is employed for the sake of clarity. The claimed subject matter, however, is not intended to be limited to the specific terminology so selected.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another example includes from the one particular value or to the other particular value. Similarly, when values are expressed as approximations, by use of the antecedent "about," it will be understood that the particular value forms another example. All ranges are inclusive and combinable. It is to be understood that the terminology used herein is for the purpose of describing particular aspects only and is not intended to be limiting.

This written description uses examples to enable any person skilled in the art to practice the claimed subject matter, including making and using any devices or systems and performing any incorporated methods. Other variations of the examples are contemplated herein. It is to be appreciated that certain features of the disclosed subject matter which are, for clarity, described herein in the context of separate examples, may also be provided in combination in a single example. Conversely, various features of the disclosed subject matter that are, for brevity, described in the context of a single example, may also be provided separately or in any sub-combination. Further, any reference to values stated in ranges includes each and every value within that range. Any documents cited herein are incorporated herein by reference in their entireties for any and all purposes.

The scope of this disclosure encompasses all changes, substitutions, variations, alterations, and modifications to the example examples described or illustrated herein that a person having ordinary skill in the art would comprehend. The scope of this disclosure is not limited to the examples described or illustrated herein. Moreover, although this disclosure describes and illustrates respective examples herein as including particular components, elements, feature, functions, operations, or steps, any of these examples may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular examples as providing particular advantages, particular examples may provide none, some, or all of these advantages.

Methods, systems, and apparatuses, among other things, as described herein may provide for receiving a demodulation reference signal (DMRS); determining a DMRS anchor, wherein the DMRS anchor comprises a resource element; determining a channel estimate at the DMRS anchor based on the DMRS for one or more (e.g., some or all) UEs scheduled in that RBG and forming a channel matrix; determining a beamformer matrix of the DMRS anchor based on the channel matrix; associating the DMRS anchor with an influence region, wherein the influence region comprises a plurality of resource elements; and assigning the beamformer matrix of the DRMS anchor to the influence region. The beamformer matrix may be thought as the pseudo-inverse of the channel matrix. The DMRS anchor may be based on channel coherence between DMRS resource elements, the amount of UEs (or UE layers) scheduled in the target RBG, number of UL layers, or the indicated availability of computational resources of the apparatus, among other things. All combinations in this paragraph and the below paragraphs (including the removal or addition of steps) are contemplated in a manner that is consistent with the other portions of the detailed description.

Methods, systems, and apparatuses, among other things, as described herein may provide for receiving a demodulation reference signal (DMRS); receiving an indication of a first DMRS anchor, wherein the first DMRS anchor comprises a first resource element; receiving an indication of a second DMRS anchor, wherein the second DMRS anchor comprises a second resource element; determining a channel estimate of the first DMRS anchor based on the DMRS; determining a channel estimate of the second DMRS anchor based on the DMRS; combining the channel estimates of the first DMRS anchor and the second DMRS anchor to create a combined DMRS anchor; determining a beamformer (e.g., beamformer matrix) of the combined DMRS anchor based on the channel estimate; associating the combined DMRS anchor with an influence region, wherein the influence region comprises a plurality of resource elements; and assigning the beamformer of the combined DRMS anchor to the influence region. The channel matrix ma include the number of receive chains divided by the amount of uplink layers. All combinations in this paragraph and the below paragraphs (including the removal or addition of steps) are contemplated in a manner that is consistent with the other portions of the detailed description.

Methods, systems, and apparatuses, among other things, as described herein may provide for UL beamformer calculations or use. A method, system, computer readable storage medium, or apparatus may provide for receiving a demodulation reference signal (DMRS); receiving an indication of a DMRS anchor, wherein the DMRS anchor comprises a resource element; determining a channel estimate of the DMRS anchor based on the DMRS; determining a beamformer of the DMRS anchor based on the channel estimate; associating the DMRS anchor with an influence region, wherein the influence region comprises a plurality of resource elements; and assigning the beamformer of the DRMS anchor to the plurality of resource elements. A method, system, computer readable storage medium, or apparatus may provide for receiving a demodulation reference signal (DMRS); receiving an indication of a first DMRS anchor, wherein the first DMRS anchor comprises a first resource element; receiving an indication of a second DMRS anchor, wherein the second DMRS anchor comprises a second resource element; combining the first DMRS anchor and the second DMRS anchor to create a combined DMRS anchor; determining a channel estimate of the combined DMRS anchor based on the DMRS; determining a beamformer of the combined DMRS anchor based on the channel estimate; associating the combined DMRS anchor with an influence region, wherein the influence region comprises a plurality of resource elements; and assigning the beamformer of the combined DRMS anchor to the plurality of resource elements. A method, system, computer readable storage medium, or apparatus may provide for determining port reduction based on the assigned beamformers of the plurality of resource elements. All combinations in this paragraph and the previous paragraph (including the removal or addition of steps) are contemplated in a manner that is consistent with the other portions of the detailed description.

What is claimed:

1. An apparatus comprising:
one or more processors; and
memory coupled with the one or more processors, the memory storing executable instructions that when executed by the one or more processors cause the one or more processors to effectuate operations comprising:
receiving a demodulation reference signal (DMRS);
determining a DMRS anchor, wherein the DMRS anchor comprises a resource element, and wherein the DMRS anchor is based on an indicated availability of computational resources of the apparatus;
determining a channel estimate at the DMRS anchor based on the DMRS for user equipments (UEs) scheduled in that resource block group (RBG);
based on the channel estimate, forming a channel matrix;

determining a beamformer matrix of the DMRS anchor based on the channel matrix;

associating the DMRS anchor with an influence region, wherein the influence region comprises a plurality of resource elements; and assigning the beamformer matrix of the DMRS anchor to the influence region.

2. The apparatus of claim 1, the operations further comprising determining port reduction based on the assigned beamformer matrix of the influence region.

3. The apparatus of claim 1, wherein the channel estimate is performed in a radio unit.

4. The apparatus of claim 1, wherein the DMRS anchor is based on channel coherence between DMRS resource elements.

5. The apparatus of claim 1, wherein the DMRS anchor is based on an amount of UEs scheduled in the RBG.

6. The apparatus of claim 1, wherein the apparatus is a base station.

7. The apparatus of claim 1, wherein the channel matrix comprises a number of receive chains divided by a number of uplink layers.

8. An apparatus comprising:

one or more processors; and memory coupled with the one or more processors, the memory storing executable instructions that when executed by the one or more processors cause the one or more processors to effectuate operations comprising:

receiving a demodulation reference signal (DMRS);

receiving an indication of a first DMRS anchor, wherein the first DMRS anchor comprises a first resource element;

receiving an indication of a second DMRS anchor, wherein the second DMRS anchor comprises a second resource element;

determining a channel estimate of the first DMRS anchor based on the DMRS;

determining a channel estimate of the second DMRS anchor based on the DMRS;

combining the channel estimates of the first DMRS anchor and the second DMRS anchor to create a combined DMRS anchor;

determining a beamformer matrix of the combined DMRS anchor based on the channel estimate;

associating the combined DMRS anchor with an influence region, wherein the influence region comprises a plurality of resource elements;

assigning the beamformer matrix of the combined DRMS anchor to the influence region; and determining port reduction based on the assigned beamformer matrix of the influence region.

9. The apparatus of claim 8, wherein the channel estimate is performed in a radio unit.

10. The apparatus of claim 8, wherein the apparatus is a base station.

11. A method comprising:

receiving a demodulation reference signal (DMRS);

determining a DMRS anchor, wherein the DMRS anchor comprises a resource element, and wherein the DMRS anchor is based on an indicated availability of computational resources of an apparatus;

determining a channel estimate at the DMRS anchor based on the DMRS for user equipments (UEs) scheduled in that resource block group (RBG);

based on the channel estimate, forming a channel matrix;

determining a beamformer matrix of the DMRS anchor based on the channel matrix;

associating the DMRS anchor with an influence region, wherein the influence region comprises a plurality of resource elements; and assigning the beamformer matrix of the DRMS anchor to the influence region.

12. The method of claim 11, further comprising determining port reduction based on the assigned beamformer matrix of the influence region.

13. The method of claim 11, wherein the channel estimate is performed in a radio unit.

14. The method of claim 11, wherein the DMRS anchor is based on channel coherence between DMRS resource elements.

15. The method of claim 11, wherein the DMRS anchor is based on an amount of UEs scheduled in the RBG.

16. The method of claim 11, wherein the channel matrix comprises a number of receive chains divided by a number of uplink layers.

* * * * *